Patented Mar. 20, 1923.

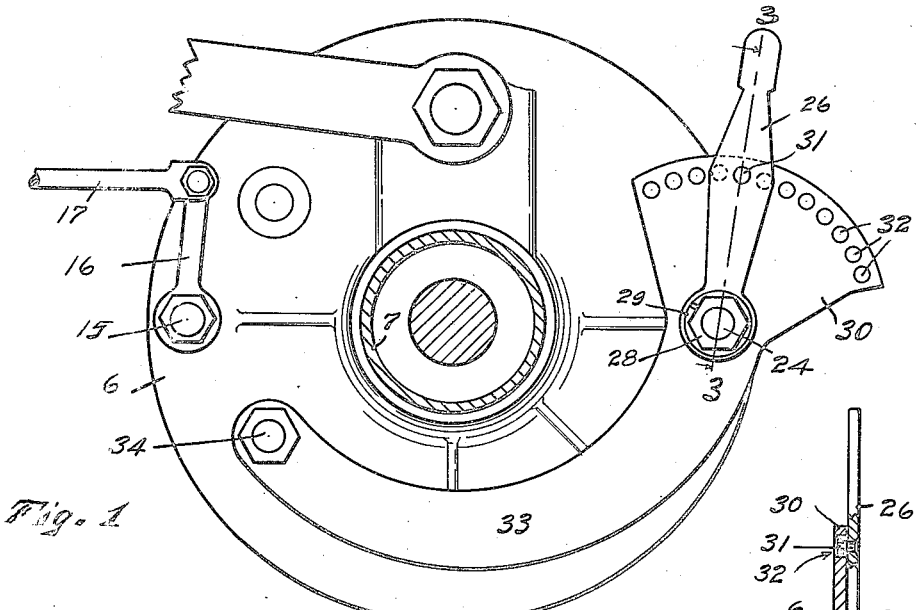
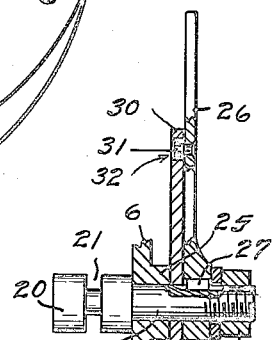
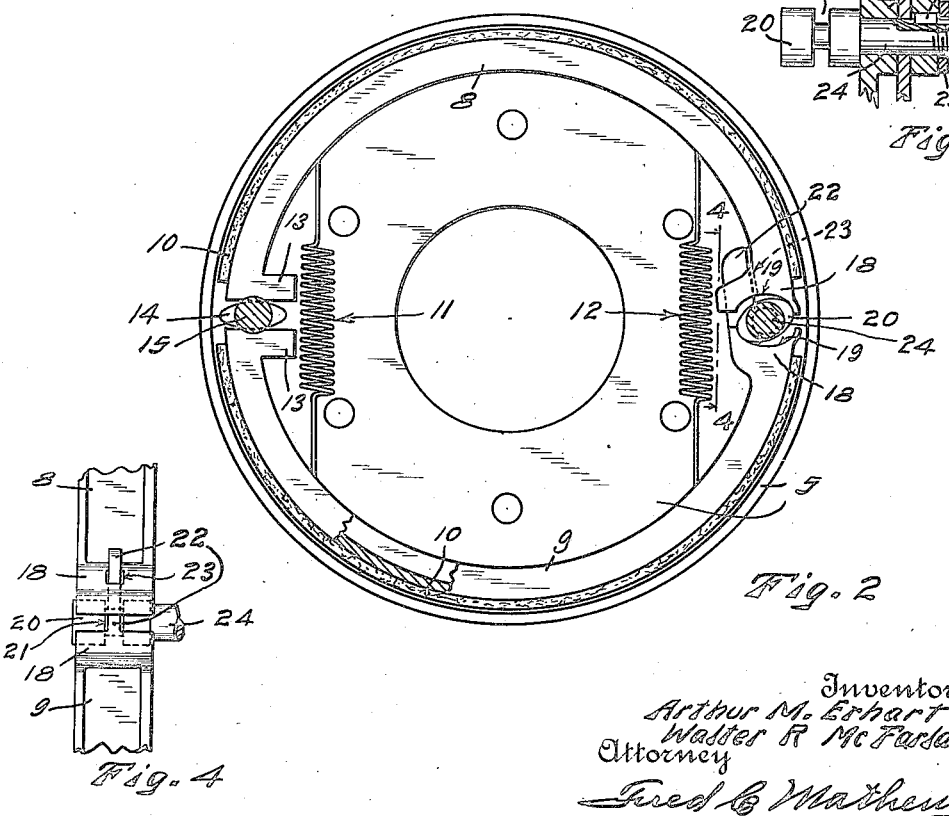

1,449,273

UNITED STATES PATENT OFFICE.

ARTHUR M. ERHART AND WALTER R. McFARLAND, OF SEATTLE, WASHINGTON.

BRAKE-ADJUSTING DEVICE.

Application filed August 6, 1921. Serial No. 490,261.

*To all whom it may concern:*

Be it known that we, ARTHUR M. ERHART and WALTER R. McFARLAND, citizens of the United States, residing at Seattle, in the county of King and State of Washington, have invented a certain new and useful Improvement in Brake-Adjusting Devices, of which the following is a specification.

This invention relates to improvements in means for adjusting brake shoes and the object of this improvement is to provide simple and reliable means by which the internal brake shoes of a motor vehicle brake may be adjusted to compensate for wear due to the use of the brake without removing the vehicle wheel or disassembling the brake.

Another object is to provide brake shoe adjusting means of this nature that is located at a point diametrically opposite to the usual cam by which the brake shoes are expanded to set the brake so that the brake shoes may be kept in the proper adjustment to cause them to wear evenly around their entire circumference and to prevent them from wearing off more rapidly at the two ends adjacent the cam by which the shoes are expanded to set the brake.

A further object is to provide simple and efficient adjusting means that will also serve as an anchor and support for the brake shoes.

A still further object is to provide brake adjusting means of this nature that may be applied to well known standard types of motor car brakes without alterations of the standard parts.

With the above and other objects in view as will appear from the following description, the invention consists in the novel construction, adaptation and combination of parts as will be more clearly hereinafter described and claimed.

In the accompanying drawing Figure 1 is a view in elevation showing the inside or cover plate of a brake drum upon which this invention is installed, the axle and axle housing that are connected with said brake drum being shown in cross section. Fig. 2 is a view showing the interior of the brake drum with the cover plate removed. Fig. 3 is a fragmentary sectional view substantially on broken line 3, 3 of Fig. 1 and Fig. 4 is a fragmentary view in elevation of the shoe substantially on broken line 4, 4 of Fig. 2.

Like reference numerals designate like parts throughout the several views.

Referring to the drawings, the numeral 5 designates a brake drum of the form commonly secured to the rear wheels of motor vehicles and 6 designates a disk or plate that is rigid with an axle housing 7 and that serves as a stationary cover for the open inner end of the drum 5, all of the said parts above mentioned being of the usual standard form of construction.

Disposed within the drum 5 is a brake shoe formed of two semi-circular segments 8 and 9 whose circumferential portions are covered with strips of brake lining 10. The brake shoe segments 8 and 9 are yieldingly urged together by tension springs 11 and 12 and the forward ends of such brake shoe segments are turned inwardly as at 13 or are otherwise suitably shaped so that a brake actuating cam 14 may be interposed therebetween, the said brake actuating cam being rigid with a short shaft 15 that projects through and is journaled in the cover 6 and that is secured to a lever arm 16 that is connected by a rod 17 with any suitable brake lever or pedal, not shown.

The ends of the brake shoe segments opposite the actuating cam 14 are enlarged as at 18 and are suitably recessed as at 19 for the reception of a brake adjusting cam 20. The cam 20 is provided with an annular groove 21 for the reception of a tongue 22 that is formed on the end of the brake shoe segment 9 and that is guided for lengthwise movement within a recess 23 in the enlarged end of the brake shoe segment 8, the tongue serving to prevent sidewise movement of the segments 8 and 9.

The adjusting cam 20 has a rigid shank 24 that projects outwardly through a bearing 25 in the cover plate 6 and that has a short lever 26 secured thereon as by a key 27, in such a manner that the cam will be turned by oscillation of the lever, the outer end of the shank 24 having a nut 28 thereon and preferably having a spring washer 29 interposed between the nut and the lever 26.

The lever 26 is movable over a segment 30 and is provided with a stud or short pin 31 that is arranged to drop into holes 32 in such segment to hold the lever in any adjusted position. The segment 30 is made an integral part of a curved arm 33 that has one hole that fits over the shank 24 and another hole in the end thereof that fits over a bolt 34 that is already provided in the cover plate 6, the said segment 30 and curved arm 33 being made of the shape shown so that they may be applied to the brake drum cover of a standard type of motor car without drilling or altering the said brake drum cover in any way.

The brake shoe segments 8 and 9 may be of any ordinary well known form and cross sectional shape except that they will be provided at their rear ends with the enlarged portions 18 for the reception of the adjusting cam 20 and with means for preventing the displacement of such enlarged ends on the cam.

In operation, the brake shoes 8 and 9 are expanded against the drum 5 to set the brakes by turning the brake operating cam 14.

When the brake lining 10 is new it will ordinarily be thick enough so that the adjusting cam 20 may be turned to lie lengthwise within the recesses 19 and thereby permit the two rear ends of the brake shoes to substantially abut against each other.

As the brake lining wears away it will obviously necessitate a greater amount of expansion of the shoes to set the brakes. This increased expansion is ordinarily obtained by imparting a greater amount of turning to the actuating cam 14 but the maximum amount of expansion that can be obtained in this way will be limited by the major dimension of the actuating cam 14 and after this maximum expansion has been reached it will be impossible to set the brakes tight unless some adjustment is made. It has heretofore been common practice to remove the wheel and reline the brakes or to shim up the actuating cam 14 after it becomes impossible to set the brakes tight. Where the brakes are allowed to wear down in this way by expanding them from a single point it has been found that the linings 10 will wear off faster near the actuating cam 14 and that the rear portions of such linings will be in fairly good conditions when the portions near the actuating cam 14 are worn out.

Where this brake adjusting device is used the brake segments may be expanded to compensate for wear of the brake bands 10 by turning the adjusting cam 20, thereby making it possible to prevent the brake bands from wearing unevenly and affording a much greater amount of expansion than is possible with only the cam 14.

In adjusting the brakes the nut 28 may be loosened, the lever 26 moved to the desired position and the nut 28 again tightened, or if the washer 29 is a spring washer as described, it may yield sufficiently to permit the lever 26 to be moved without loosening the nut 28.

The device shown is designed especially for use on a standard type of motor car but it will be understood that the invention may be applied to practically any ordinary type of internal brake.

It will also be understood that changes in the form and dimensions of various parts of the device may be resorted to within the scope of the following claims.

What we claim is:—

1. Brake apparatus embodying two brake shoes having abutting ends, one of said ends having a recess therein, a rigid tongue on the end of the other brake shoe arranged to project into and be guided within said recess and an adjusting cam interposed between said two ends and having a groove that fits over said tongue.

2. In brake apparatus of the class described a brake drum, semicircular shoes disposed within said brake drum, means interposed between two adjacent ends of said brake shoes for expanding the same to set the brake, a brake adjusting cam interposed between the other two ends of said brake shoes, said brake adjusting cam having an annular slot therein, a rigid tongue on the end of one of said brake shoes arranged to fit within the slot in said cam, the end of the opposite brake shoe having a recess for slidably receiving said tongue.

3. The combination with a brake including a brake drum, of two semi-circular shoes disposed within said brake drum, said brake shoes having enlarged ends, a non-rotatable cover plate disposed at one end of said brake drum, actuating means pivoted in said cover plate and connected with two adjacent ends of said brake shoes for expanding said shoes to set the brake, a brake adjusting cam disposed between the other two adjacent ends of said brake shoes said brake adjusting cam having an annular groove, a tongue on the enlarged end of one of said brake shoes and arranged to fit within said groove, the enlarged end of the opposite brake shoe having a recess for slidably receiving said tongue, a shank on said brake adjusting cam and arranged to project outwardly through said cover plate, a lever arm secured to said shank and a fixed segment to which said lever arm may be secured.

The foregoing specification signed at Seattle, Washington, this 30th day of June, 1921.

ARTHUR M. ERHART.
WALTER R. McFARLAND.